United States Patent
Kokins et al.

(10) Patent No.: US 11,443,404 B1
(45) Date of Patent: Sep. 13, 2022

(54) VIEWABILITY TESTING IN A COMPUTER-GENERATED ENVIRONMENT

(71) Applicant: Bidstack Group PLC, London (GB)

(72) Inventors: Arvids Kokins, London (GB); Francesco Petruzzelli, London (GB)

(73) Assignee: Bidstack Group PLC, London (GB)

( * ) Notice: Subject to any disclaimer, the term of this patent is extended or adjusted under 35 U.S.C. 154(b) by 0 days.

(21) Appl. No.: 17/303,453

(22) Filed: May 28, 2021

(51) Int. Cl.
  *G06T 1/20* (2006.01)
  *G06T 15/00* (2011.01)
  *G06T 7/50* (2017.01)

(52) U.S. Cl.
  CPC .................. *G06T 1/20* (2013.01); *G06T 7/50* (2017.01); *G06T 15/005* (2013.01)

(58) Field of Classification Search
  CPC ........................................................ G06T 7/50
  See application file for complete search history.

(56) References Cited

U.S. PATENT DOCUMENTS

| | | | |
|---|---|---|---|
| 2007/0079331 A1* | 4/2007 | Datta ..................... | A63F 13/61 725/23 |
| 2017/0213312 A1* | 7/2017 | Woo ........................ | G06T 11/40 |
| 2019/0197786 A1* | 6/2019 | Molyneaux ........... | G06F 3/0304 |
| 2020/0402297 A1* | 12/2020 | Brigg ...................... | G06T 1/60 |

FOREIGN PATENT DOCUMENTS

| | | | |
|---|---|---|---|
| WO | 2018178224 A1 | 10/2018 | |
| WO | 2019142179 A1 | 7/2019 | |

* cited by examiner

*Primary Examiner* — Samantha (Yuehan) Wang
(74) *Attorney, Agent, or Firm* — EIP US LLP (57) ABSTRACT

A system configured to determine an extent to which an object in a computer-generated scene is visible from a virtual camera, including a rendering engine comprising a depth buffer and arranged to render the computer-generated scene, and a viewability testing module. The viewability testing module is configured to: generate a plurality of points distributed across a surface of the object; determine a depth map value for each point within a field of view of the virtual camera; determine whether each such point is visible from the perspective of the virtual camera based on a comparison between the determined depth map value for the point and a corresponding one or more of the depth map values stored in the depth buffer; and determine the extent to which the object is visible in dependence on which of the plurality of points are determined to be visible.

20 Claims, 6 Drawing Sheets

VIEWABILITY TESTING IN A COMPUTER-GENERATED ENVIRONMENT

BACKGROUND OF THE INVENTION

Field of the Invention

The present disclosure relates to determining an extent to which an object in a computer-generated scene is visible from a perspective of a virtual camera. The disclosure has particular, but not exclusive, relevance to determining a degree of occlusion of an object in a computer-generated scene using graphics processing hardware.

Description of the Related Technology

The popularity of video games has risen meteorically, and at the time of writing the global video game industry is worth more than the music and film industries combined. In the early years of gaming, video game developers and associated entities made money through the sale of video games on physical media (laser discs and cartridges). Nowadays, video games are more often downloaded or even streamed onto a connected gaming device such as a personal computer (PC), games console or smartphone. Whilst this model still allows commercial entities to make money from the sale of video games, it is common for further revenue streams to be pursued based on the sale of advertising space, including advertising space within the video games themselves. In the context of video games, adverts may be presented to a user as part of a loading screen or menu, or alternatively may be rendered within a computer-generated environment during gameplay, leading to the notion of in-game advertising. For example, in a sports game, advertising boards within a stadium may present adverts for real-life products. In an adventure game or first-person shooting game, adverts for real-life products may appear on billboards or other objects within the game environment.

Revenue models based on the sale of advertising space are ubiquitous in the context of film and television, as well as for websites and social media applications. Advertisers are typically charged in dependence on the expected or actual reach of a given advert, or in other words the expected or actual number of "impressions" of the advert experienced by consumers. For television and film, an advertising fee may be negotiated in dependence on a number of showings of the advert and a predicted audience size for each showing. For a website or social media application, the advertising fee may be related to a number of page views or clicks. Distribution of an advert may then be controlled in dependence on these factors.

In the above cases, it is technically straightforward to predict and measure the number of advertising impressions experienced by users. For video games, the situation is different. Because different players will experience a given video game differently depending on actions taken by the players and/or random factors within the video game code, it is not generally possible to predict a priori the extent to which a given advert within a video game will be viewed, and therefore the number of impressions experienced by the player. In order for the advertising revenue model to be applied to in-game advertising, the visibility of an advert may therefore be measured in real time as a video game is played.

The data gathered from measuring the visibility of an advert may be used to determine an advertising fee or to control the distribution of the advert. The data may also be used to inform the advertising entity, the game developer, or a third party, of the effectiveness of the advert. Various factors affect the degree to which an in-game advert is experienced by a player of the video game, including: the duration of time that the advert is on screen; the size of the advert in relation to the total size of the screen or viewport; and the proportion of an advert which is visible within the screen or viewport. The visibility of the advert depends on whether and how much the advert extends outside the viewport, and whether any portion of the advert is occluded by objects appearing in the scene with the advert.

A known method of determining whether an in-game advert is occluded by objects in a computer-generated scene is based on ray tracing or ray casting, in which algebraic ray equations are determined for rays emanating from a virtual camera in a direction towards one or more points on the advert, and then used to determine whether any intersections exist between the rays and objects (such as polygons) lying between the virtual camera and the one or more points on the advert. Any point for which at least one such intersection exists is determined to be occluded from the perspective of the virtual camera.

Although ray tracing methods may be convenient for certain types of video game (such as first-person shooting games in which ray tracing is already used to determine interactions between projectiles and objects within the game), there is no general requirement for a video game to provide ray tracing functionality for polygons corresponding to those rendered within the game environment, meaning that ray tracing solutions may lead to unreliable results and/or may require significant modifications to the video game code. For example, sports games with custom physics may not provide ray tracing functionality and therefore the video game code would have to be modified to enable such functionality and to provide polygons suitable for implementing such functionality. The implementation would then have to be audited to ensure reliability. Lack of reliability of the occlusion detection functionality may be unacceptable for applications in which advertising revenue or advert distribution is dependent on the results of the occlusion detection.

Ray tracing is computationally expensive and, whilst specialized processing units for ray tracing do exist for certain graphics processing applications (such as animated films), at the time of writing ray tracing is too slow for real-time rendering of entire scenes for most video games. Instead, real-time rendering of scenes is usually based on rasterization techniques, and therefore gaming devices include specialist hardware (graphics processing units) for accelerating such rasterization techniques.

SUMMARY

According to a first aspect, there is provided a system configured to determine an extent to which an object in a computer-generated scene is visible when viewed from a perspective of a virtual camera. The system includes a rendering engine arranged to render the computer-generated scene from the perspective of the virtual camera. The rendering includes storing, in a depth buffer, depth map data corresponding to a depth map of the computer-generated scene and comprising respective depth map values at pixel locations spanning a field of view of the virtual camera. The system further includes a viewability testing module configured to: generate a plurality of points distributed substantially evenly across a surface of the object; for each point of the plurality of points lying within the field of view of the virtual camera: determine a respective depth map value from the perspective of the virtual camera; and determine, using the depth map data stored in the depth buffer, whether the point is visible from the perspective of the virtual camera based on a comparison between the depth map value determined for the point and a corresponding one or more of the depth map values stored in the depth buffer; and determine the extent to which the surface is visible in dependence on which of the plurality of points are determined to be visible from the perspective of the virtual camera.

The use of depth buffer data for viewability testing after the rendering of a scene can result in improved computational efficiency compared with methods based on ray tracing, whilst advantageously ensuring that the results of the viewability testing reliably correspond to what is actually rendered on screen. The method is widely compatible with video games of any genre provided that rasterization-based rendering is utilized, enabling game developers or third parties to incorporate such functionality into video games with minimum alteration to their video game code.

In examples, the rendering engine includes a GPU, and the depth buffer is stored in video RAM of the GPU. The viewability testing module may also be at least partially implemented within the GPU, for example using shader code. Utilizing the GPU for viewability testing enables the testing to be performed in a highly parallelized manner whilst reducing the processing load on the CPU of the host system.

Determining whether each point of the plurality of points is visible from the perspective of the virtual camera may include populating an input texture or input buffer with a respective test element located at each of the plurality of points, and processing the depth buffer and the input texture or input buffer using one or more shaders to populate an output texture or output buffer comprising a representation of how many of the test fragments indicate a lesser or equal distance from the virtual camera than the corresponding one or more depth map values stored in the depth buffer.

Alternatively, determining whether each point of the plurality of points is visible from the perspective of the virtual camera may be performed by a compute shader, if a compute shader is supported. Using a compute shader may lead to a faster and more efficient viewability testing routine compared with than a pixel other types of shader (such as a pixel shader) because compute shaders are able to operate independently of other parts of the graphics pipeline.

Determining the extent to which the object is visible in dependence on which of the plurality of points are determined to be visible from the perspective of the virtual camera may include performing synchronous or asynchronous readback from the video RAM of the GPU. The system may then be configured to schedule further rendering between determining whether the points are visible from the perspective of the virtual camera and performing the synchronous or asynchronous readback. In this way, it can be ensured that the depth testing is completed for all points before the readback is performed, reducing lag and improving the responsiveness of the method.

In cases where the scene is rendered in frames at a first frequency, the viewability testing module may be configured to perform the viewability testing for each rendered frame (for example with a readback delay of one or more frames), or may be configured to perform the viewability testing at a second frequency lower than the first frequency. In this way, the processing demands of the viewability testing may be reduced relative to the processing demands of the rendering.

The viewability testing module may be arranged to generate the plurality of points such that the number of generated points depends on the dimensions of the object as viewed from the perspective of the virtual camera. In this way, the viewability testing may be performed at a higher granularity for objects appearing larger on screen, reflecting the fact that changes in viewability of such objects will have a more pronounced impression on the user, whilst ensuring processing resources are not wastefully used determining the viewability of distant objects.

Determining whether each point of the plurality of points is visible from the perspective of the virtual camera may further be based on whether the point lies within a field of view of the virtual camera. For example, points lying outside the field of view of the camera, either due to being outside of the viewing frustum of the camera or having a depth map value indicating that the point is behind the camera, may be discarded prior to the depth buffer testing. In this way, parts of the object lying outside a viewing frustum of the virtual camera do not contribute to the measured viewability.

The plurality of points may contain fewer points than a number of pixels spanned by the surface when viewed from the perspective of the virtual camera. In this way, the processing demands of the viewability testing can be reduced, for example to a level which is insignificant compared with the processing demands of the scene rendering.

Prior to determining whether the points are visible from the perspective of the virtual camera, the viewability testing module may be configured to offset the plurality of points from the surface in a direction towards the virtual camera or otherwise in a substantially outward direction from the surface (e.g. in the direction of an exact/average normal to the surface). In this way, the depth buffer testing can be made robust against sampling errors caused by the finite size of pixels and/or discretization of the depth buffer, avoiding erroneous determinations of the object not being visible, for example where the surface of the object corresponds to at least a portion of one or more rendering primitives of the scene.

As an additional, or alternative, means of improving the robustness and accuracy of the depth buffer testing, the determining of whether a point is visible from the perspective of the virtual camera, for at least one of the plurality of points, may be based on a comparison between the determined depth map value for the point and an interpolated depth map value derived from a plurality of corresponding depth map values stored in the depth buffer.

Storing the depth map of the computer-generated scene may include: initializing the depth buffer to indicate, for each pixel location within the field of view of the virtual camera, a maximum distance from the virtual camera representable by a depth map value; determining fragments of a set of rendering primitives of the computer-generated scene, each fragment having a pixel location within the field of view of the virtual camera; for each determined fragment, determining a depth map value and, if the determined depth map value for the fragment indicates a lesser or equal distance from the virtual camera than a depth map value currently stored in the depth buffer at the pixel location of the fragment, overwriting said depth map value currently stored in the depth buffer with the determined depth map value for the fragment. The overwriting of the depth map value currently stored in the depth buffer may be dependent on the fragment having an alpha value greater than a predetermined threshold. When this is done, the viewability testing automatically takes account of the opacity of objects in the scene.

According to a second aspect, there is provided a method of determining an extent to which an object in a computer-generated scene is visible when viewed from a perspective of a virtual camera. The method includes rendering the computer-generated scene from the perspective of the virtual camera, said rendering including storing, in a depth buffer, a depth map data comprising respective depth map values for pixel locations spanning a field of view of the virtual camera. The method further includes: generating a plurality of points distributed substantially evenly over a surface of the object; determining, for each point of the plurality of points, a respective pixel location and depth map value from the perspective of the virtual camera; determining whether each point of the plurality of points is visible from the perspective of the virtual camera based on a comparison between the depth map value determined for the point and a corresponding one or more of the depth map values stored in the depth buffer; and determining the extent to which the object is visible in dependence on which of the plurality of points are determined to be visible from the perspective of the virtual camera.

According to a third aspect, there is provided a non-transient storage medium comprising computer-readable instructions which, when executed by a computing system, cause the computing system to perform the method described above.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further notes that certain examples are described schematically with certain features omitted and/or necessarily simplified for the ease of explanation and understanding of the concepts underlying the examples.

Embodiments of the present disclosure relate to determining an extent to which an object is visible from a perspective of a virtual camera within a computer-generated environment such as a video game environment. In particular, embodiments described herein address the above-mentioned issues associated with ray tracing approaches, whilst advantageously making use of data generated during a rasterization-based rendering process and, in some embodiments, harnessing graphics processing hardware that is ubiquitous in modern gaming devices.

Figure 1:
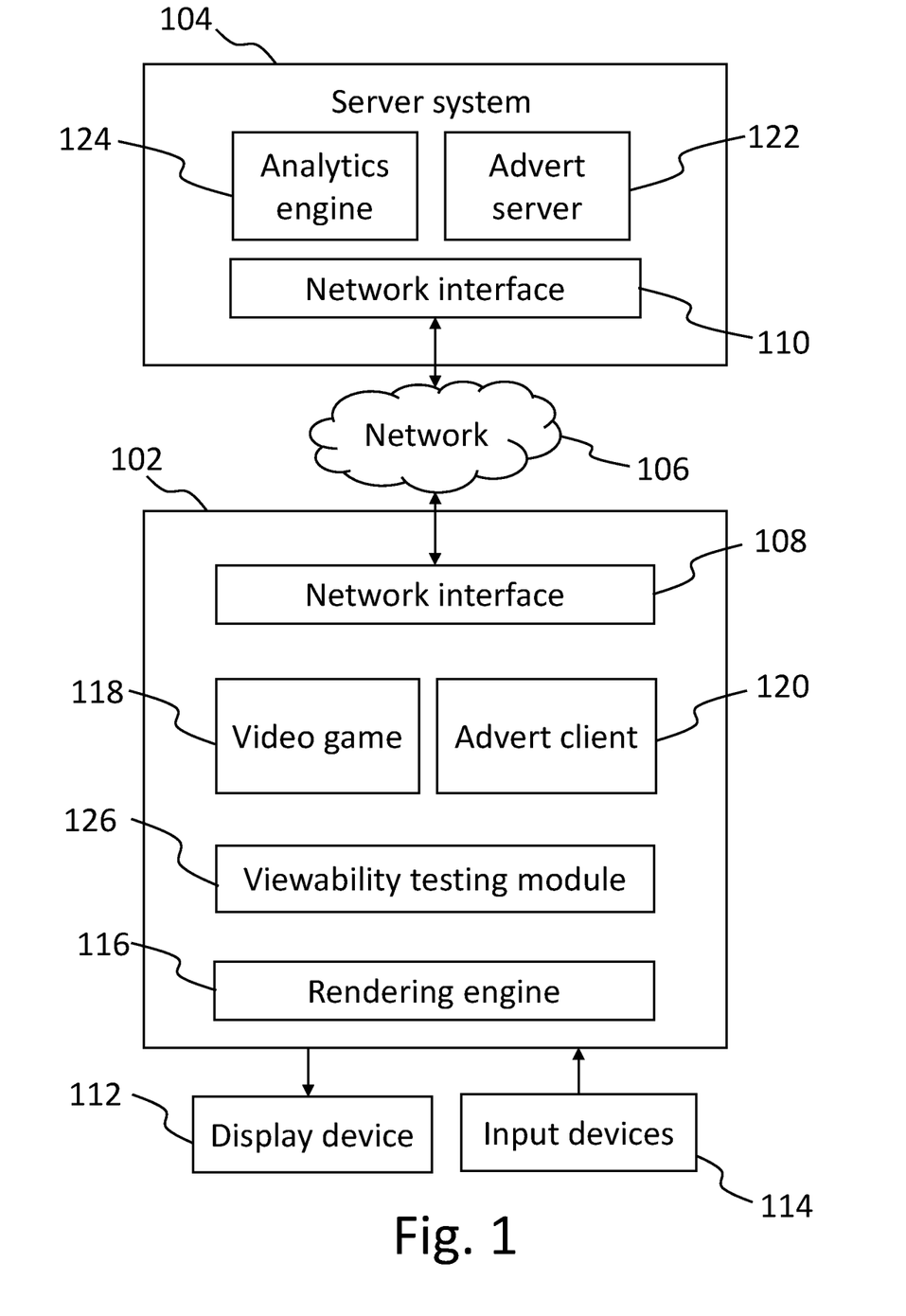
FIG. 1 schematically shows functional components of a system in accordance with examples.

FIG. 1 schematically shows functional components of a gaming device 102 and a server system 104 arranged to communicate over a network 106 using respective network interfaces 108, 110. The various functional components shown in FIG. 1 may be implemented using software, hardware, or a combination of both as will be explained in more detail hereinafter. The gaming device 102 can be any electronic device capable of processing video game code to output a video signal to a display device 112 in dependence on user input received from one or more input devices 114. The video signal typically includes a computer-generated scene rendered in real time by a rendering engine 116, for example using rasterization-based rendering techniques and/or ray tracing techniques. The gaming device 102 may for example be a personal computer (PC), a laptop computer, a tablet computer, a smartphone, a games console, a smart tv, a virtual/augmented reality headset with integrated computing hardware, or a server system arranged to provide cloud-based gaming services to remote users. It will be appreciated that the gaming device 102 may include additional components not shown in FIG. 1, for example additional output devices such as audio devices and/or haptic feedback devices.

The server system 104 may be a standalone server or may be a networked system of servers, and in this example is operated by a commercial entity responsible for managing the distribution of adverts to end users (gamers) on behalf of advertisers, though in other examples an equivalent or similar system may be operated directly by an advertiser.

The gaming device 102 may be arranged to store a video game 118 locally, for example after downloading the video game 118 over the network 110, or may be arranged to read the video game 118 from a removable storage device such as an optical disc or removable flash drive. The video game 118 may be purchased by a user of the gaming device 102 from a commercial entity such as a games developer, license holder or other entity, or may be obtained for free, via a subscription model, or in accordance with any other suitable revenue model. In any of these cases, the commercial entity may obtain additional revenue by selling advertising space within the video game 118 to advertising entities, either directly or via a third party. For example, a video game developer may allocate particular objects, surfaces, or other regions of a scene within the video game 118 as advertising space, such that advertisements appear within said regions when the scene is rendered during gameplay.

The rendered advertisements may be static images or videos and may be dynamically updated as the user plays the video game 118, for example in response to certain events or certain criteria being satisfied. Furthermore, the rendered advertisements may be updated over time, for example to ensure that the rendered advertisements correspond to active advertising campaigns, and/or in dependence on licensing agreements between commercial entities. The advertisements for rendering are managed at the gaming device 102 by an advert client 120, which communicates with an advert server 122 at the server system 104. For example, the advert server 122 may transmit advert data to the advert client 120 periodically or in response to predetermined events at the gaming device 102 or the server system 104.

In addition to the advert server 122, the server system 104 includes an analytics engine 124 configured to process impression data received from the gaming device 102 and other gaming devices registered with the server system 104. The impression data may include, inter alia, information regarding how long, and to what extent, an advertisement is visible to users of the gaming devices. The impression data may include information at various levels of detail, for example a simple count of advertising impressions as determined in accordance with a given metric, or more detailed information such as how long a given advertisement is visible to a user during a session, the average on-screen size of the advertisement during that time, and the proportion of the advertisement that is visible during that time.

The analytics engine may process the impression data for a variety of purposes, for example to match a number of advertising impressions with a number agreed between the distributing party and the advertiser, to trigger the advert server 122 and/or the advert client 120 to update an advert appearing within the video game 118, or to determine a renumeration amount to be paid by the advertiser. It will be appreciated that other uses of impression data are possible, though a detailed discussion of such uses is outside the scope of the present disclosure.

In order to generate impression data for processing by the analytics engine 124, the gaming device 102 includes a viewability testing module 126. The viewability testing module 126 is responsible for determining the extent to which an advertisement located within a scene is visible when the scene is rendered by the rendering engine 116 from a perspective of a virtual camera. In particular, the viewability testing module 126 is responsible for detecting when an advert appearing within a rendered scene is occluded by other objects in the scene. In accordance with the present disclosure, the viewability testing module 126 is arranged to utilize data generated by the rendering engine 116 during the rendering of scenes. It should be noted that, whilst the viewability testing module 126 is shown separately from the video game 118 in FIG. 1, the functionality of the viewability testing module 126 may in fact be defined within the video game 118, for example as code written by the game developer or provided by the operator of the server system 104 to the game developer as part of a software development kit (SDK).

Figure 2:
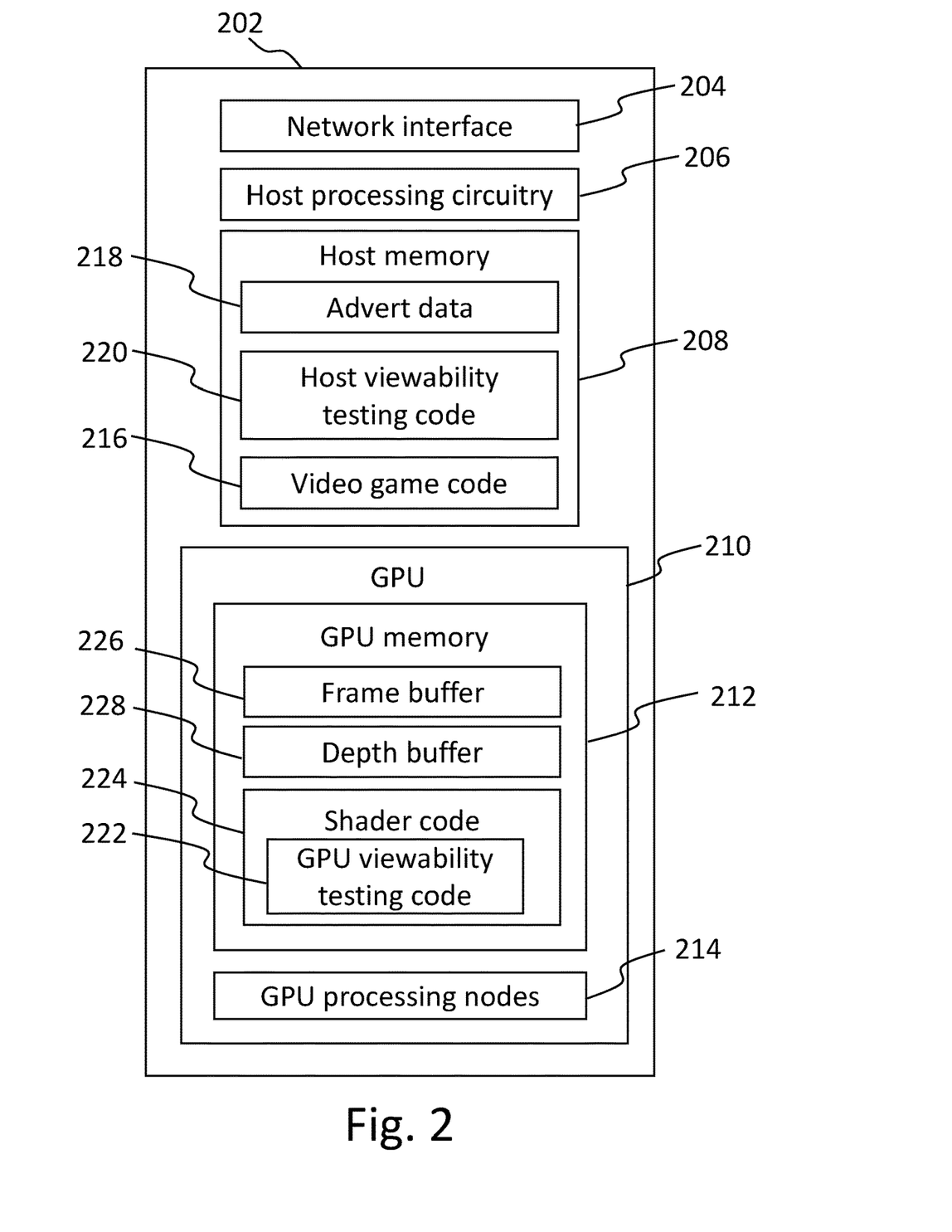
FIG. 2 schematically shows hardware and software components of a gaming device in accordance with examples.

FIG. 2 is a schematic block diagram representing an example of a gaming device 202 with software/hardware components arranged to implement the functionality of the gaming device 102 described above. In particular, FIG. 2 shows components of the gaming device 202 that are relevant to the rendering of scenes within a video game, and to viewability testing. The gaming device 102 in this example advantageously utilizes graphics processing hardware to improve the reliability and efficiency of the viewability testing process. The gaming device 202 includes a network interface 204 for communicating with a server system (not shown), along with processing circuitry and memory, referred to hereinafter as host processing circuitry 206 and host memory circuitry 208 to distinguish from graphics processing hardware, which in this example includes a GPU 210. The host processing circuitry 206 includes a CPU, and may optionally include one or more other processing units, application specific integrated circuits (ASICs), gate arrays and so on. The gaming device 202 may also include further specialist processing units not shown in FIG. 2, such as a digital signal processor (DSP) or neural processing unit (NPU).

The host memory 208 includes volatile random-access memory (RAM) including static random-access memory (SRAM) and dynamic random-access memory (DRAM), as well as non-volatile storage such as a solid-state drive (SSD), flash memory and/or a hard disk drive (HDD).

The gaming device 202 features discrete graphics and therefore the GPU 210 is a component of a removable graphics card that further includes dedicated GPU memory 212, also referred to as video random-access memory (VRAM), arranged to be accessed rapidly by processing cores 214 of the GPU 210. In other examples, a gaming device may feature integrated graphics, in which case a GPU shares system memory with other processors such as a host CPU.

The host memory 208 stores video game code 216 encompassing all aspects of a video game, including scene information, graphics and rendering information, a physics engine, game modes, and so on. The video game code 216 may be based upon a game engine such as the Unity engine or the Unreal engine. The host memory 208 further stores advert data 218 which includes image and/or video data corresponding to advertisements to be presented to the user of the gaming device 202, along with data associating these advertisements with objects, surfaces, or other regions of scenes within the video game. The host memory 208 further stores host viewability testing code 220, which in this example works in conjunction with GPU viewability testing code 222 stored in the GPU memory 212 to perform the viewability testing functionality, as will be described in more detail hereinafter.

The GPU viewability testing code 222 in this example is a subset of shader code 224, which also performs other functions implemented on the GPU including those involved in the rendering of computer-generated scenes. The GPU memory 212 further includes various buffers for temporarily storing data generated during the rendering process, including a frame buffer 226 and a depth buffer 228. The frame buffer 226 is used to store pixel data to be transmitted to a display device. The primary function of the depth buffer 228 is to ensure that fragments of objects hidden behind other objects in the scene do not make it to the frame buffer 226 for rendering (thereby solving the so-called hidden surface problem). When a scene is rendered from a perspective of a virtual camera, the depth buffer 228 is configured to associate depth map values with pixel locations spanning a field of view of the virtual camera. Depth map values are indicative of distances from the virtual camera to objects in the scene, for example in the axial direction of the virtual camera or in a direction of a ray directly from the virtual camera to the object, and may vary linearly, logarithmically, or any other suitable increasing or decreasing function of the axial distance.

In this example, the depth buffer 228 is an integer Z-buffer, which has an equivalent data structure to that of a monochromatic image in which every element corresponds to a pixel location and is associated with an integer depth map value. Each possible integer corresponds to a range of axial distances from the virtual camera, between a user-defined minimum value (near plane) and maximum value (far plane). In other examples, a far plane may not be user defined but instead may correspond to a maximum or minimum integer representable in the relevant number format. In other examples still, only a subset of the depth map values representable using the number format correspond to possible distances from the camera. The depth map values may be stored in 8-bit, 16-bit, 24-bit, 32-bit, or any other suitable integer format, where larger bit sizes allow for more precise rendering of scenes containing closely spaced objects. Alternatively, a Z-buffer may use a floating-point number representation, leading to greater dynamic range and therefore favorable precision distribution throughout the depth range, but higher memory and processing demands. In the case of an integer Z-buffer, the distances corresponding to the integer values are grouped more densely close to the near plane, and more sparsely farther away, resulting in better precision closer to the virtual camera (see for example FIG. 5, in which the dashed lines perpendicular to the axis of the virtual camera 502 delimit the ranges covered by adjacent integer values). Other types of depth buffer, such as a W-buffer, may allow for more evenly distributed precision of the depth map values. The use of the depth buffer in the rendering of a scene and for viewability testing in accordance with the present disclosure is described hereafter with reference to FIG. 3.

Figure 3:
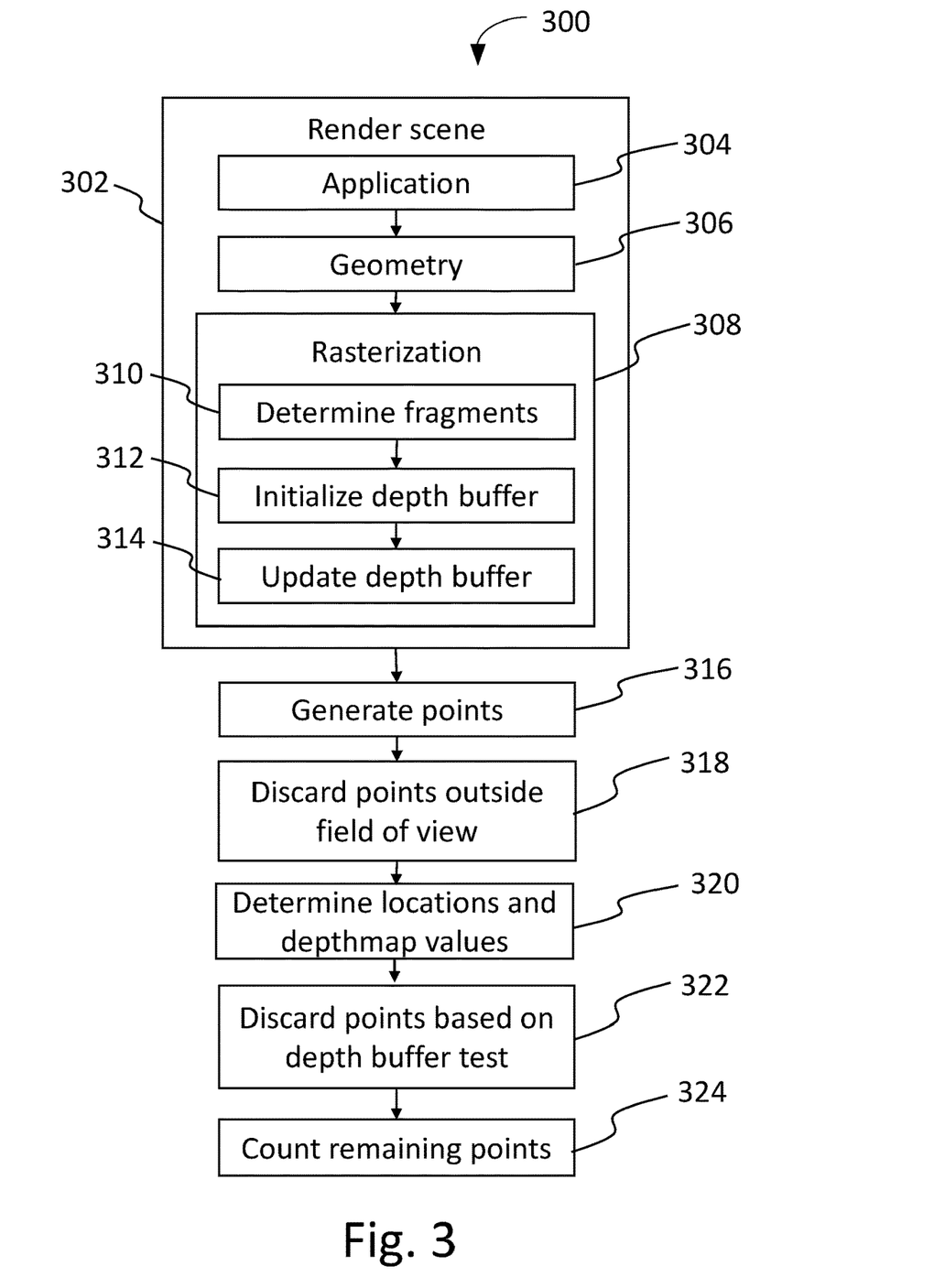
FIG. 3 is a flow diagram representing an occlusion detection method in accordance with examples.

FIG. 3 shows an example of a method 300 performed by the gaming device 202 for determining an extent to which an object in a computer-generated scene is visible when viewed from a perspective of a virtual camera. The method includes rendering, at 302, the computer-generated scene. As is common for real-time rendering of scenes within video games, the rendering process is based on a graphics pipeline including an application stage 304, a geometry stage 306, and a rasterization stage 308. In this example, the application stage 304 is performed by the host processing circuitry 206 (specifically the CPU) in accordance with rendering information forming part of the video game code 216 stored in the host memory 208, whereas the geometry stage 306 and the rasterization stage 308 are performed by the GPU 210 in accordance with shader code 224 stored in the GPU memory 212. Although these steps are shown in series for simplicity, it will be appreciated that these stages, and processing routines executed within these stages, may be performed in parallel to one another. Furthermore, the stages described herein may be modified, added to, or replaced, depending on the implementation of the graphics pipeline.

During the application stage 304, a set of rendering primitives is obtained for a set of models forming the scene, in accordance with the video game code 216 stored in the host memory 208. The rendering primitives generally include points, lines, and polygons such as triangles, which collectively represent objects. Each polygon may have an outward facing side corresponding to an outer surface of the object represented by the polygon, where the outer facing side is typically implied from a vertex winding order during rasterization, as opposed to being stored independently in data.

During the geometry stage 306, co-ordinates of the primitives are transformed from "model" space to "world" space to "view space" to "clip" space, in dependence on a position and orientation (pose) of the models in the scene, and a pose of the virtual camera. This may be performed using a single matrix. Some primitives may be discarded or clipped, for example primitives falling completely or partially outside the field of view of the virtual camera or outside a predetermined guard band extending beyond the field of view of the virtual camera, along with optionally any facing away from the virtual camera, after which the coordinates of surviving primitives are scaled to "normalized device coordinates (NDC)" such that the NDC values for primitives (or portions of primitives) to be displayed within the viewport fall within a predetermined range (usually [-1;1]). Furthermore, depth bias may be introduced to certain polygons to ensure that coplanar polygons (for example representing a surface and a shadow on the surface) are rendered correctly and independently of the rendering order. The resulting output is then scaled to match the size of the viewport in which the scene is to be rendered. The viewport may correspond to the entire display of a display device, or may correspond to only a portion of a display device for example in the case of split-screen multiplayer, a viewport presented within a decorated frame, or a virtual screen within the computer-generated scene.

During the rasterization stage 308, discrete fragments are determined at 310 from the rendering primitives, where the size and position of each fragment corresponds to a respective pixel of the frame buffer/viewport. The depth buffer 228 is used for determining which fragments are to be written as pixels to the frame buffer 226, and at least the fragments to be written to the frame buffer 226 are colored using texture mapping techniques in accordance with one or more pixel shaders. To avoid redundant processing, some video games use a separate initial rendering pass that writes only to the depth buffer 228, then perform further rasterization steps in a subsequent rendering pass, filtered by the populated depth buffer 228. Lighting effects may also be applied to the fragments.

The depth buffer 228 is initialized, at 312, to indicate a maximum distance from the virtual camera for each pixel location within the field of view of the virtual camera. In the present example, the depth buffer 228 is a Z-buffer and each element of the Z-buffer is initialized to an integer value indicating a maximum distance from the virtual camera. The GPU then updates the Z-buffer at 314. For each fragment determined at 310, a depth map value is determined and, if the depth map value for the fragment indicates a lesser or equal distance from the virtual camera than a depth map value currently stored in the depth buffer at the pixel location of the fragment, the fragment may proceed to the frame buffer 226 and the depth map value currently stored in the depth buffer is overwritten with the determined depth map value for the fragment. Additional logic may be applied to determine whether a given fragment causes an update of the Z-buffer. In particular, fragments having an alpha value (opacity) below a threshold value may not cause the Z-buffer to be updated.

When the above process has been performed for each fragment determined at 310, the depth buffer 228 contains a depth map of the scene to be rendered, the depth map comprising depth map values of fragments to be written to the frame buffer 226. In some examples, further rendering steps such as alpha testing and antialiasing are applied before the fragments are written to the frame buffer 226 and screen thereafter.

Figure 4:
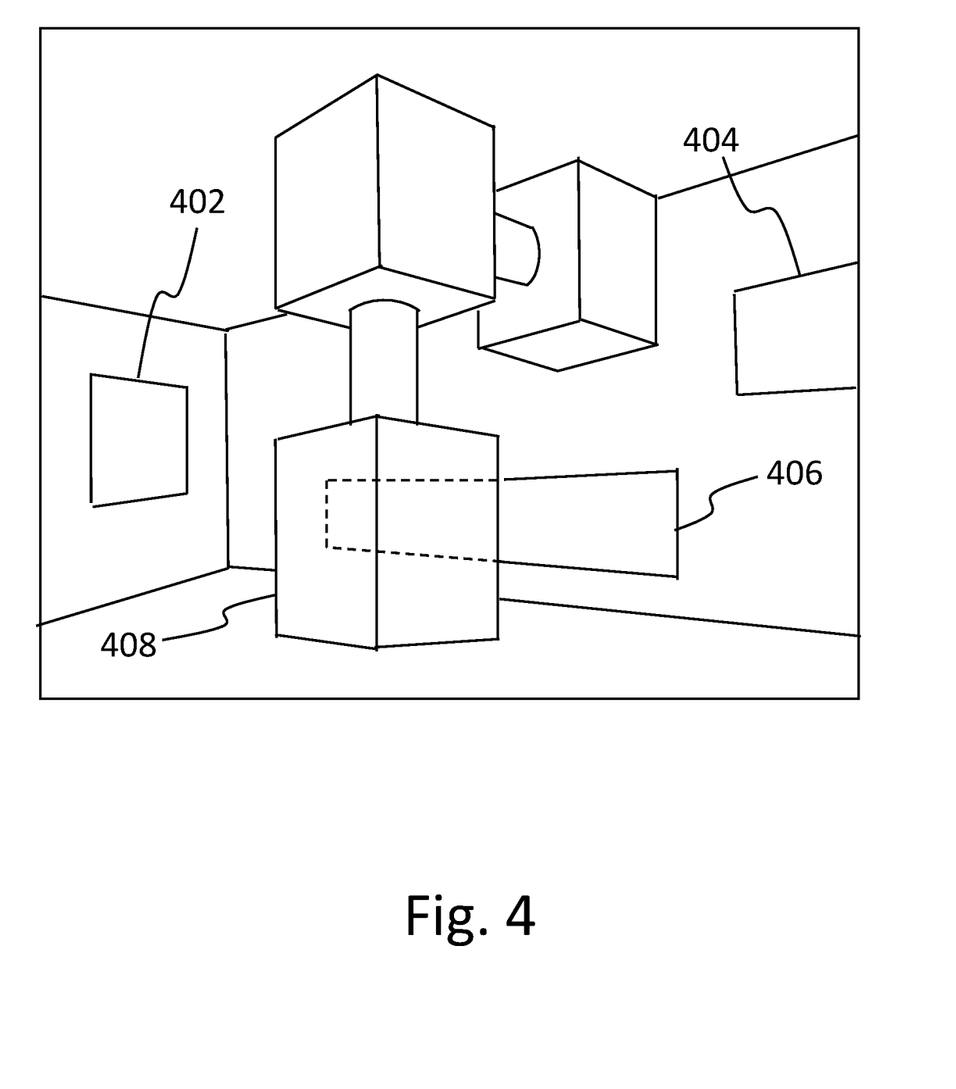
FIG. 4 shows an example of a computer-generated scene rendered from a perspective of a virtual camera.
Figure 5:
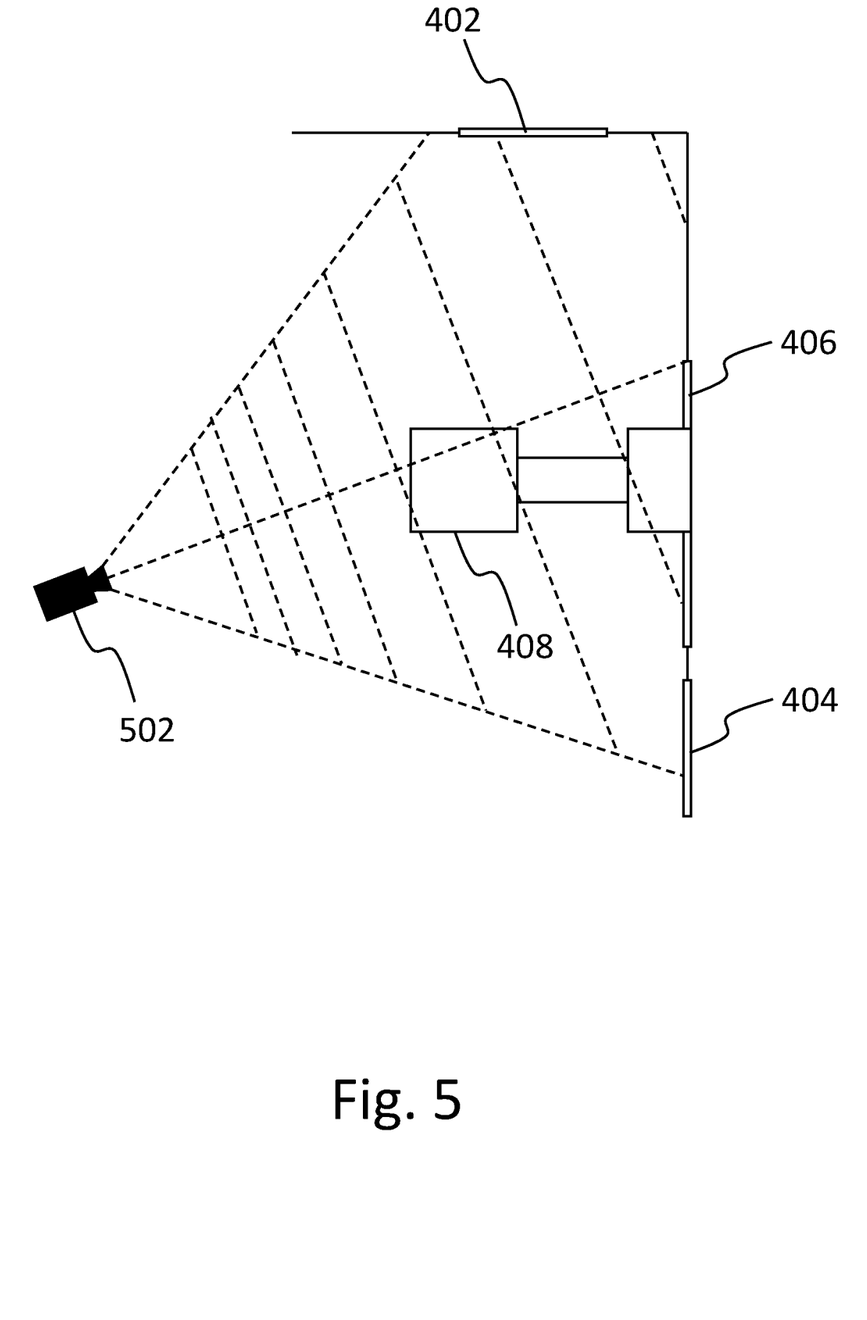
FIG. 5 shows a plan view of the computer-generated scene and virtual camera of FIG. 4.

FIG. 4 shows a view of a computer-generated scene rendered in accordance with the rendering process described above. The scene includes three rectangular advert surfaces 402, 404, 406. In this example, each of the advert surfaces 402, 404, 406 corresponds to a single advertisement mapped to a single quadrilateral ("quad") of the scene mesh using texture mapping techniques. In other examples, a single advertisement may be mapped to several polygons, for example where the advertisement is to be positioned on a substantially curved or otherwise non-flat surface. In other examples, a single advertisement may be mapped to a portion of a polygons or portions of several polygons. FIG. 5 shows a plan view of the scene of FIG. 4, including a virtual camera 502 from which the scene is viewed in FIG. 4, and dashed lines perpendicular to the axis of the virtual camera 502 representing discrete depth map values from the virtual camera 502.

The advert surface 402 is fully visible from the perspective of the virtual camera 502, because the entire advert surface 402 lies within the viewing frustum of the virtual camera 502 and is not occluded by any objects in the scene. The advert surface 404 is only partially visible from the perspective of the virtual camera 502, because part of the surface 404 lies outside the viewing frustum of the virtual camera 502. The advert surface 406 is only partially visible from the perspective of the virtual camera, because part of the advert surface 406 is occluded by an object 408 (the occluded part of the advert surface 406 is shown in FIG. 3 using dashed lines, but does not appear in the rendering of the scene). The methods described hereafter provide a convenient and computationally efficient means of determining the proportions of the advert surfaces 402, 404, 406 that are visible within any rendered view of the scene.

Returning to FIG. 3, the method 300 continues with generating, at 316, a set of points distributed across a surface of the object of interest. It is noted that, whilst in FIG. 3 the generating of points is shown after the rendering of the scene, in examples the set of points may be generated in parallel with the rendering of the scene, for example using the host processing circuitry 206 whilst the GPU 210 performs the geometry stage 306 and rasterization stage 308 of the rendering 302. Generating the set of points may involve determining world co-ordinates of each point, given a set of world co-ordinates associated with the surface of the object (such as coordinates of its vertices) or a matrix representing a transformation from a default surface to the position and orientation of the surface in world space.

Figure 6:
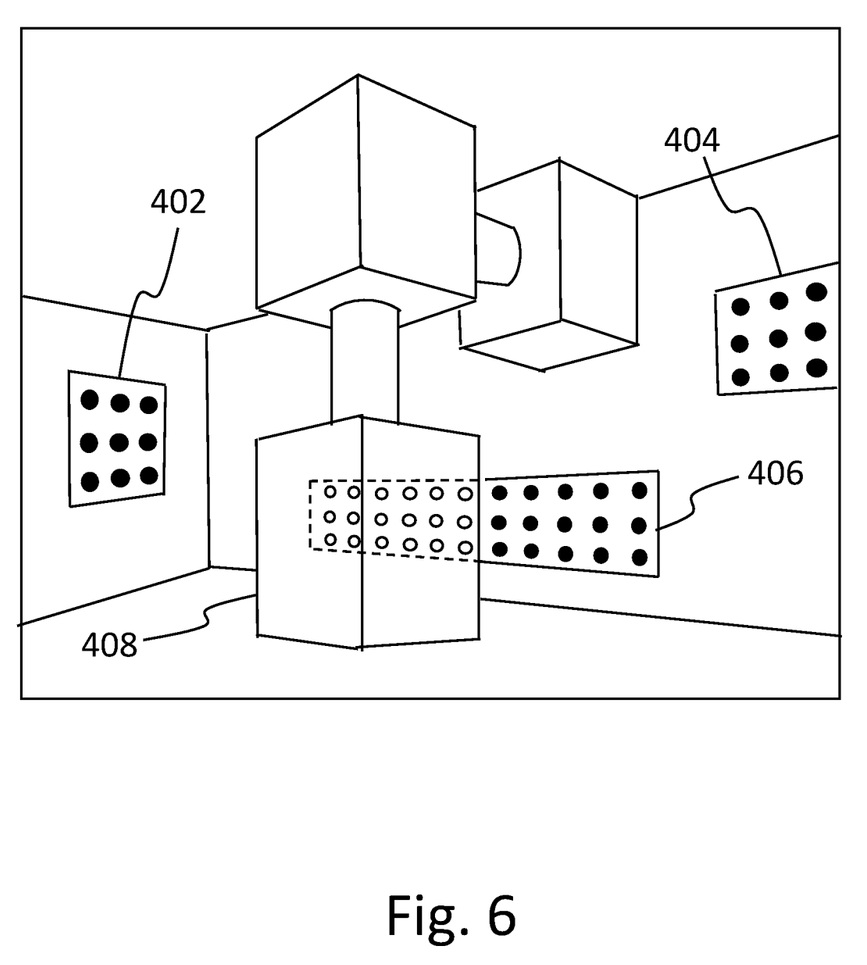
FIG. 6 illustrates an example of an occlusion detection method applied to the computer-generated scene of FIG. 4.

The generated points may be distributed uniformly across the surface, for example on a regular grid, or may be distributed nonuniformly, for example using random sampling, Poisson disk sampling, or an irregular grid for example having periodic offsets between rows or columns. Even if the points are nonuniformly distributed, in order for accurate measuring of the visibility of the surface, it is desirable that the points are distributed substantially evenly across the surface, meaning that the average density of points does not vary significantly across the surface. The set of points may be arranged to extend to the edges of the surface or alternatively may extend only partway to the edges of the surface. FIG. 6 shows an example in which a set of points has been generated for each of the advert surfaces 402, 404, 406 of FIG. 4. The points (represented by filled and empty circles) are uniformly distributed across the advert surfaces 402, 404, 406, with the outermost points inset from the edges of the advert surfaces 402, 404, 406.

Advantageously, the number of generated points can be less than the number of pixels spanned by the surface when viewed from the perspective of the virtual camera, or in other words less than the number of pixels of the viewport occupied by the rendered surface. This may result in a relatively low computational cost of the visibility testing process in comparison with the various rendering processes. However, the number of points should be high enough to give sufficient resolution for viewability testing. The number of points may depend on the on-screen dimensions of the surface when rendered from the perspective of the virtual camera. For example, the points may be arranged on a regular grid with the number of grid lines in each direction being scaled in accordance with a corresponding edge width of the surface when viewed from the perspective of the virtual camera.

In an example in which the surface is a quadrilateral, the points may be generated using the following algorithm (written in pseudocode, which is to be understood to be illustrative and not prescriptive):

```
vector3lerp(a: vector3, b: vector3, t: scalar)=a+(b-a)*t
p00, p10, p01, p11=the four corners of the quadrilateral
for x in [0; count_x)
{
  for y in [0; count_y)
  {
    fx=(x+0.5)/count_x
    fy=(y+0.5)/count_y
    point=vector3lerp(
       vector3lerp(p00, p10, fx),
       vector3lerp(p01, p11, fx), fy)
  }
}
```

The values count_x and county above represent the number of columns and rows of points respectively and can be scaled in accordance with the edge width of the quadrilateral when viewed from the perspective of the virtual camera. Alternatively, the quadrilateral may be defined by the application of a surface-world transformation matrix T to a default square $[-1;1]^2$, in which case the points are given by T*[2*fx-1, 2*fy-1, 0].

Having generated the set of points, the method 300 continues with discarding, at 318, those which lie outside the field of view of the virtual camera. Typically, this involves discarding points that lie behind the camera or behind a predetermined near plane, and discarding points which lie outside the viewing frustum of the virtual camera. Furthermore, points corresponding to any surface for which predetermined viewability criteria are not satisfied may be discarded. Examples of viewability criteria include more than a predetermined proportion of the surface (such as 30%, 50%, or 70%) lying within the field of view of the virtual camera, the surface having a projected area greater than a predetermined proportion of the viewport area (such as 1%, 2%, or 5%), or an angle between the outward-facing normal vector of the surface and an axial direction towards the camera being greater than a predetermined angle (such as 45°, 60° or 75°). Points corresponding to advert surfaces facing away from the user may be automatically discarded in this way. As an alternative to discarding/rejecting points lying outside the field of view of the virtual camera, the surface of interest may be clipped before the generating of the set of points, such that all of the points in the set lie within the field of view of the virtual camera.

Having clipped the set of points, the method 300 continues with determining, at 320, a respective location and depth map value for each remaining point in the set from the perspective of the virtual camera. In one example the co-ordinates of the points are transformed from world space to NDC space. The determined depth map values may be stored in a fixed-point or floating-point number format. The determining may be performed by the host processing circuitry 206 while the GPU 210 performs the scene rendering 302, or alternatively may be performed by the GPU 210 using shader code. Using the GPU 210 enables the transformation to be performed in a highly parallelized manner and reduces the processing load on the host processing circuitry 206.

At 322, the depth map values of the remaining points in the set are compared with a corresponding one or more depth map values stored in the depth buffer 228. If the location of the point does not correspond exactly to a center of one of the elements of the depth buffer, then the depth value of the nearest element of the depth buffer may be used, or alternatively the depth values stored in the depth buffer 228 may be interpolated. Using interpolated depth values may improve the accuracy of the depth comparison and mitigate the effect of sampling errors caused by the finite size of pixels, whereby a depth map value of a point may otherwise be compared with a depth map value of a pixel at a slightly offset position from the point, potentially leading to an erroneous outcome of the depth test. Furthermore, the depth buffer 228 may be downscaled before the comparison is performed. Points for which the determined depth map value indicates a greater distance from the virtual camera than the corresponding value(s) in the depth buffer 228 are discarded. In this way, the stored depth map of the scene, which is already generated during the scene rendering 302, is reused for the purpose of viewability testing. The use of depth buffer data in this way advantageously ensures that the results of the viewability testing reliably correspond to what is actually rendered on screen. In cases where the Z-buffer is configured with additional logic, for example to exclude fragments with alpha values below a threshold value, the depth map comparison at 322 will automatically take this logic into account with no modifications or additional processing.

In some cases, a surface of interest may correspond to at least part of one or more polygons within a computer-generated scene (for example, an advert will typically be painted onto an object in the scene). In this case, sampling errors caused by the finite size of the pixels as described above and/or errors caused by the discretization of depth map values in the depth buffer 228 may result in the surface being incorrectly determined to be occluded when the surface is in fact visible from the perspective of the virtual camera. In order to avoid this, the depth map values of the points may be offset slightly in a direction towards the virtual camera, or alternatively in a substantially outward direction with respect to the surface (for example, parallel or approximately parallel to the outward-facing normal). In this way, points lying within a surface corresponding to one or more rendering primitives in the scene will not be discarded based on a comparison with depth map values associated with said primitives.

The depth map comparison at 322 may be performed by the GPU 210, for example using shader code 224, enabling a high degree of parallelization across the points. For example, an input texture or input buffer may first be populated with test elements at an appropriate resolution. The test elements may indicate respective depth map values for the set of points and associated sampling co-ordinates (or values from which the sampling co-ordinates can be derived), which enable comparisons with the depth map values stored in the depth buffer 228. A custom graphics pipeline may then be configured using shader code to compare the input texture or input buffer with the depth buffer 228 to populate either an output pixel or output texture comprising a representation of how many of the test elements indicate a lesser or equal distance from the virtual camera that a corresponding depth map value or values stored in the depth buffer 228. With regards to an output texture, this may for example be a binary output texture of the same resolution as the input texture, with elements indicating whether the depth map value of each test element indicates a lesser or equal distance from the virtual camera than a corresponding depth map value currently stored in the depth buffer 228. Alternatively, an output texture or output buffer may be configured to have an offset value, pixel value, or other value which counts the number of test elements passing or failing the depth test. This may be implemented within the custom graphics pipeline by configuring the primitive vertices appropriately and utilizing an additive blend mode to accumulate the depth test outputs for each test element.

As an alternative to configuring a custom graphics pipeline for viewability testing, the depth map comparison at 322 may be implemented using a compute shader if such a shader is available. Using a compute shader may lead to a more efficient viewability testing routine compared with other types of shader (such as a pixel shader) because compute shaders are able to operate independently of other parts of the graphics pipeline. As a further alternative, the depth buffer 228 may be read back from the GPU memory 212 to the host memory 208 and the depth map comparison may then be performed by the host processing circuitry 206 (e.g. the CPU).

In the example of FIG. 6, the points of the advert surface 406 occluded by the object 408 have depth map values indicating a greater distance from the virtual camera than the corresponding depth map values of the depth buffer, which are depth map values for points of the advert surface 406 that are not occluded by the object 408 and are nearest to the camera. These occluded points (represented by white circles) are therefore discarded from the set. By contrast, the nonoccluded points of the advert surface 406 (represented by black circles) are not discarded.

The method 300 concludes with counting, at 324, how many points of the generated set remain after points have been discarded during field of view testing at 318 and depth comparison at 322. The extent to which the object is visible from the perspective of the virtual camera is proportional to the number of remaining points. The extent to which the object is visible may refer to a proportion of the surface that is visible, which may be computed either by (i) dividing the number of remaining points by the total number of generated points, or (ii) dividing the number of remaining points by the number of points within the field of view of the virtual camera and multiplying the result by the proportion of the area of the surface lying within the field of view of the virtual camera. In the example of FIG. 6, fifteen of the thirty-three points of the advert surface 406 are determined to be visible from the perspective of the virtual camera. The proportion of the advert surface 406 which is visible from the perspective of the virtual camera is therefore determined to be 15/33=45%.

Alternatively, the extent to which the object is visible may refer to a proportion of the viewport taken up by the object. If the number of points is proportional to the on-screen size of the surface, the proportion of the viewport taken up by the object may be calculated by dividing the number of remaining points by the number of points which would fit on a surface covering the entire viewport. Alternatively, the proportion of the viewport taken up by the object may be determined by dividing the number of remaining points by the number of points within the field of view of the virtual camera and multiplying the result by the projected area of the surface in NDC space divided by the total area of the field of view in NDC space (which is 4, assuming NDC space is normalized to [-1,1]).

As an alternative to counting the number of remaining points at 324, a respective area taken up by each remaining point (for example as a proportion of the area of the viewport) may be determined in dependence on the distribution of points and the position and orientation of the object, in which case a sum of these areas may be used to give the desired result.

Evaluations of either metric described above may be used to generate impression data or other summary data, for example to be transferred to a remote server system as described above with reference to FIG. 1.

In examples where the depth comparison at 322 is performed using the GPU 210, counting the number of remaining points may include performing synchronous or asynchronous readback from the GPU memory 212. Further rendering steps may be scheduled after the depth map comparison at 322, and before the counting. The further rendering steps may include, for example, post-processing or lighting in the case that deferred shading is used. In some cases, one or more further frames may be rendered in full before the readback is performed. The inventors have found that, with modern GPUs and drivers, rendering 4 frames is sufficient to minimize the lag. By scheduling additional rendering steps, it is expected that depth map comparison at 322 will be complete for all points before the count is performed, reducing lag and improving the responsiveness of the viewability measurement.

In the example of FIG. 6, fifteen of the points of the advert surface 406 are determined to be visible from the perspective of the virtual camera. Eighteen points of the advert surface 406 are determined not to be visible from the perspective of the virtual camera. The proportion of the advert surface 406 which is visible from the perspective of the virtual camera is therefore determined to be 15/(15+18) =15/33=45%.

The above embodiments are to be understood as illustrative examples. Further embodiments are envisaged. For example, although the disclosure is concerned with determining advertising impressions within a video game environment, equivalent principles may be applied in any situation where it is desired to determine whether a surface, object, or region within a scene is visible from a perspective of a virtual camera, for example to trigger events in a video game or virtual reality environment in dependence on a user viewing objects in the environment.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A system configured to determine a value indicative of an extent to which an object in a computer-generated scene is visible when viewed from a perspective of a virtual camera, the system comprising:
 a rendering engine configured to render the computer-generated scene from the perspective of the virtual camera, the rendering comprising storing, in a depth buffer, depth map data corresponding to a depth map of the computer-generated scene and comprising respective depth map values at pixel locations spanning a field of view of the virtual camera; and
 a viewability testing module configured to:
  generate a plurality of points distributed substantially evenly across a surface of the object;
  for each point of the plurality of points lying within the field of view of the virtual camera:
   determine a respective depth map value from the perspective of the virtual camera; and
   determine, using the depth map data stored in the depth buffer, whether the point is visible from the perspective of the virtual camera based on a comparison between the determined depth map value for the point and a corresponding one or more of the depth map values stored in the depth buffer; and
   in dependence on the comparison, write data to a region of memory configured to record how many of the plurality of points are determined to be visible from the perspective of the virtual camera; and
  determine, based at least in part on how many of the plurality of points are determined to be visible as recorded in the region of memory, the value indicative of the extent to which the object is visible when viewed from the perspective of the virtual camera.

2. The system of claim 1, wherein storing the depth map data comprises:
 determining fragments of a set of rendering primitives of the computer-generated scene, each fragment having a pixel location within the field of view of the virtual camera;
 initializing the depth buffer to indicate, for each pixel location within the field of view of the virtual camera, a maximum distance from the virtual camera representable by a depth map value; and
 for each determined fragment, determining a depth map value and, if the determined depth map value for the fragment indicates a lesser or equal distance from the virtual camera than the depth map value currently stored in the depth buffer at the pixel location of the fragment, overwriting said depth map value currently stored in the depth buffer with the determined depth map value for the fragment.

3. The system of claim 1, wherein the overwriting of said depth map value currently stored in the depth buffer is dependent on the fragment having an alpha value greater than a predetermined threshold.

4. The system of claim 1, wherein the rendering engine comprises a GPU, the depth buffer is stored in video RAM of the GPU, and the viewability testing module is at least partially implemented by one or more shaders within the GPU.

5. The system of claim 4, wherein the determining of whether each point of the plurality of points is visible from the perspective of the virtual camera comprises:
 populating an input texture or input buffer with test elements indicating respective depth map values for the plurality of points; and
 processing the depth buffer and the input texture or input buffer using the one or more shaders to populate an output texture or output buffer comprising a representation of how many of the test elements indicate a lesser or equal distance from the virtual camera than the corresponding one or more depth map values stored in the depth buffer.

6. The system of claim 4, wherein the determining of whether each point of the plurality of points is visible from the perspective of the virtual camera is performed by a compute shader.

7. The system of claim 4, wherein:
 determining the extent to which the object is visible in dependence on which of the plurality of points are determined to be visible from the perspective of the virtual camera comprises performing synchronous or asynchronous readback from the video RAM of the GPU; and
 the system is configured to schedule further rendering between determining whether the points are visible from the perspective of the virtual camera and performing the synchronous or asynchronous readback.

8. The system of claim 1, wherein the viewability testing module is arranged to generate the plurality of points such that the number of generated points depends on dimensions of the surface of the object as viewed from the perspective of the virtual camera.

9. The system of claim 1, wherein determining whether each point of the plurality of points is visible from the perspective of the virtual camera is further based on whether the point lies within a field of view of the virtual camera.

10. The system of claim 1, wherein for at least one point of the plurality of points, the determining of whether the point is visible from the perspective of the virtual camera is based on a comparison between the determined depth map value for the point and an interpolated depth map value derived from a plurality of corresponding depth map values stored in the depth buffer.

11. The system of claim 1, wherein the plurality of points contains fewer points than a number of pixels spanned by the surface when viewed from the perspective of the virtual camera.

12. The system of claim 1, wherein prior to determining whether the points are visible from the perspective of the virtual camera, the viewability testing module is configured to offset the plurality of points from the surface of the object in a direction towards the virtual camera or in a substantially outward direction with respect to the surface of the object.

13. The system of claim 1, arranged to associate an advertisement with the surface of the object in dependence on stored advertisement data, wherein said rendering comprises rendering the advertisement on the surface of the object.

14. The system of claim 1, arranged to generate summary data indicative of determined extent to which the object is visible from the perspective of the virtual camera.

15. The system of claim 1, arranged to generate the computer- generated scene in dependence on video game code.

16. The system of claim 1, wherein:
the rendering engine is configured to render the computer-generated scene in frames at a first frequency; and
the viewability testing module is configured to determine the extent to which the object is visible at a second frequency lower than the first frequency.

17. A method of determining a value indicative of an extent to which an object in a computer-generated scene is visible when viewed from a perspective of a virtual camera, the method comprising:
rendering the computer-generated scene from the perspective of the virtual camera, said rendering comprising storing, in a depth buffer, depth map data corresponding to a depth map of the computer-generated scene and comprising respective depth map values at pixel locations spanning a field of view of the virtual camera;
generating a plurality of points distributed substantially evenly across a surface of the object;
for each point of the plurality of points lying within the field of view of the virtual camera:
determining a respective depth map value from the perspective of the virtual camera; and
determining, using the depth map data stored in the depth buffer, whether the point is visible from the perspective of the virtual camera based on a comparison between the determined depth map value for the point and a corresponding one or more of the depth map values stored in the depth buffer; and
in dependence on the comparison, writing data to a region of memory configured to record how many of the plurality of points are determined to be visible from the perspective of the virtual camera; and
determining, based at least in part on based at least in part on how many of the plurality of points are determined to be visible as recorded in the region of memory, the value indicative of the extent to which the surface is visible when viewed from the perspective of the virtual camera.

18. The method of claim 17, wherein storing the depth map of the computer-generated scene comprises:
determining fragments of a set of rendering primitives of the computer-generated scene, each fragment having a respective pixel location within the field of view of the virtual camera;
initializing the depth buffer to indicate, for each pixel location within a field of view of the virtual camera, a maximum distance from the virtual camera representable by a depth map value; and
for each determined fragment, determining a depth map value and, if the determined depth map value for the fragment indicates a lesser or equal distance from the virtual camera than a depth map value currently stored in the depth buffer at the pixel location of the fragment, overwriting said depth map value currently stored in the depth buffer with the determined depth map value for the fragment.

19. The method of claim 18, wherein the overwriting of said depth map value currently stored in the depth buffer is dependent on the fragment having an alpha value greater than a predetermined threshold.

20. A non-transient storage medium comprising computer-readable instructions which, when executed by a computing system, cause the computing system to perform a method of determining a value indicative of an extent to which an object in a computer-generated scene is visible when viewed from a perspective of a virtual camera, the method comprising:
rendering the computer-generated scene from the perspective of the virtual camera, said rendering comprising storing, in a depth buffer, depth map data corresponding to a depth map of the computer-generated scene and comprising respective depth map values at pixel locations spanning a field of view of the virtual camera;
generating a plurality of points distributed substantially evenly across the surface;
for each point of the plurality of points lying within the field of view of the virtual camera:
determining a respective depth map value from the perspective of the virtual camera; and
determining whether the point is visible from the perspective of the virtual camera based on a comparison between the determined depth map value for the point and a corresponding one or more of the depth map values stored in the depth buffer; and
in dependence on the comparison, writing data to a region of memory configured to record how many of the plurality of points are determined to be visible from the perspective of the virtual camera; and
determining, based at least in part on how many of the plurality of points are determined to be visible as recorded in the region of memory, the value indicative of the extent to which the object is visible when viewed from the perspective of the virtual camera.

* * * * *